United States Patent Office 3,292,738
Patented Dec. 20, 1966

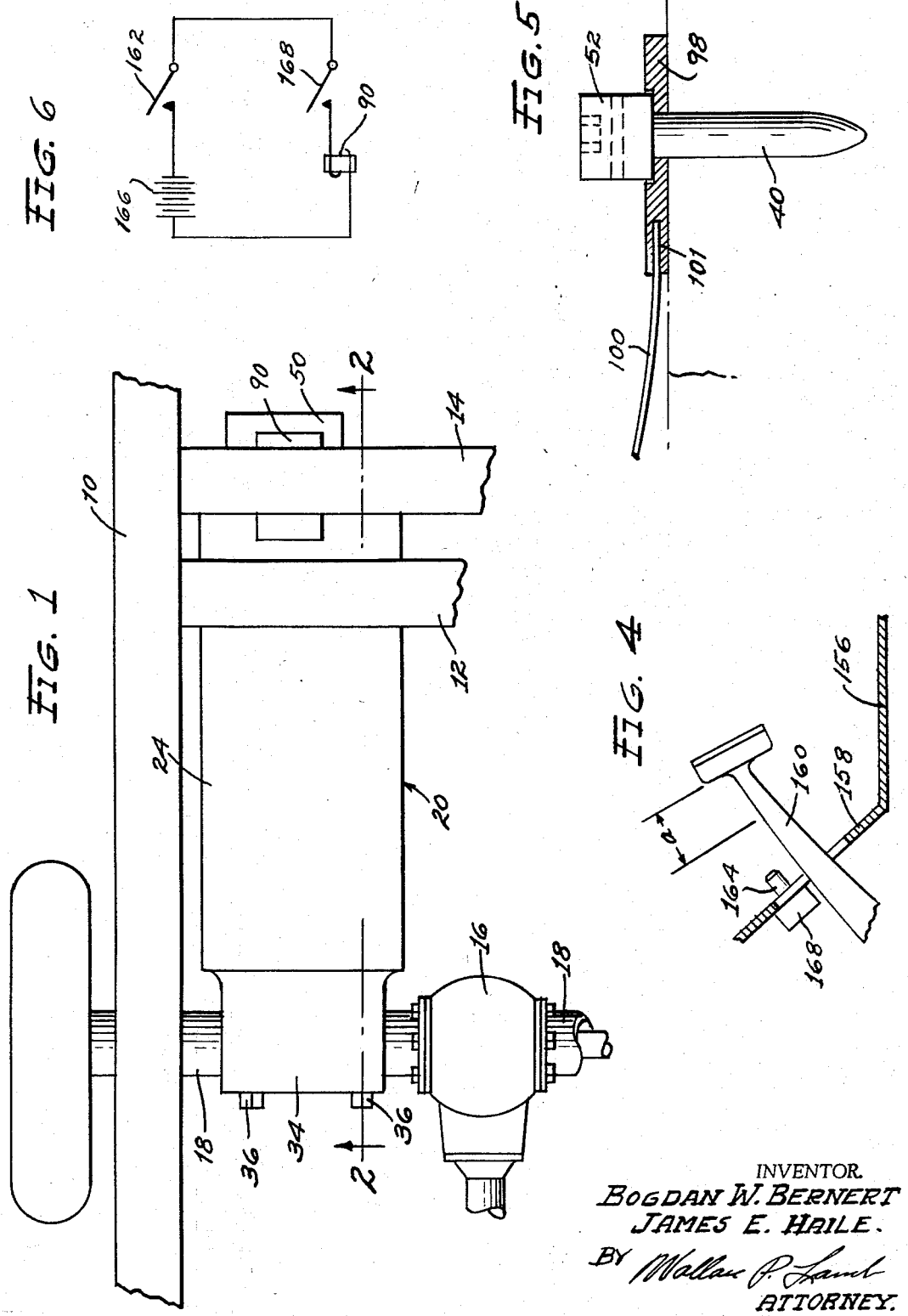

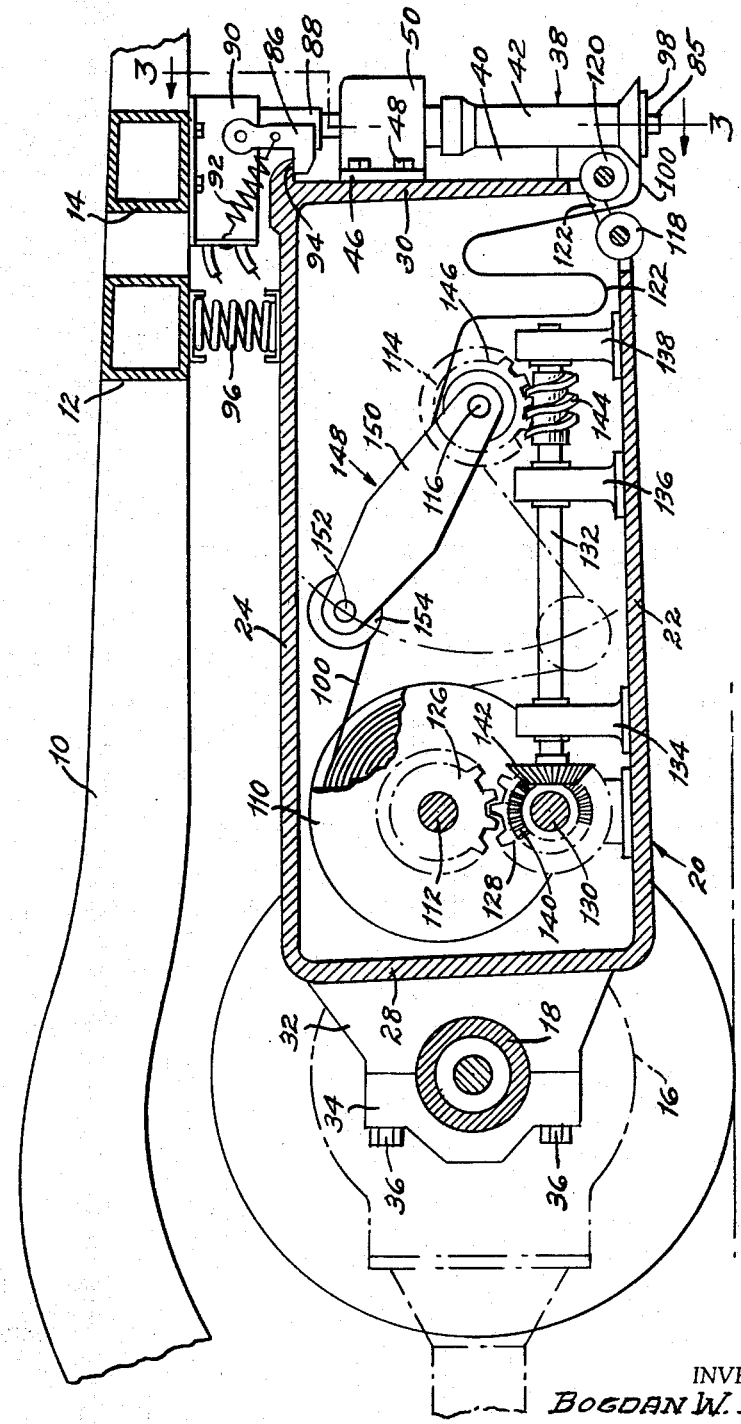

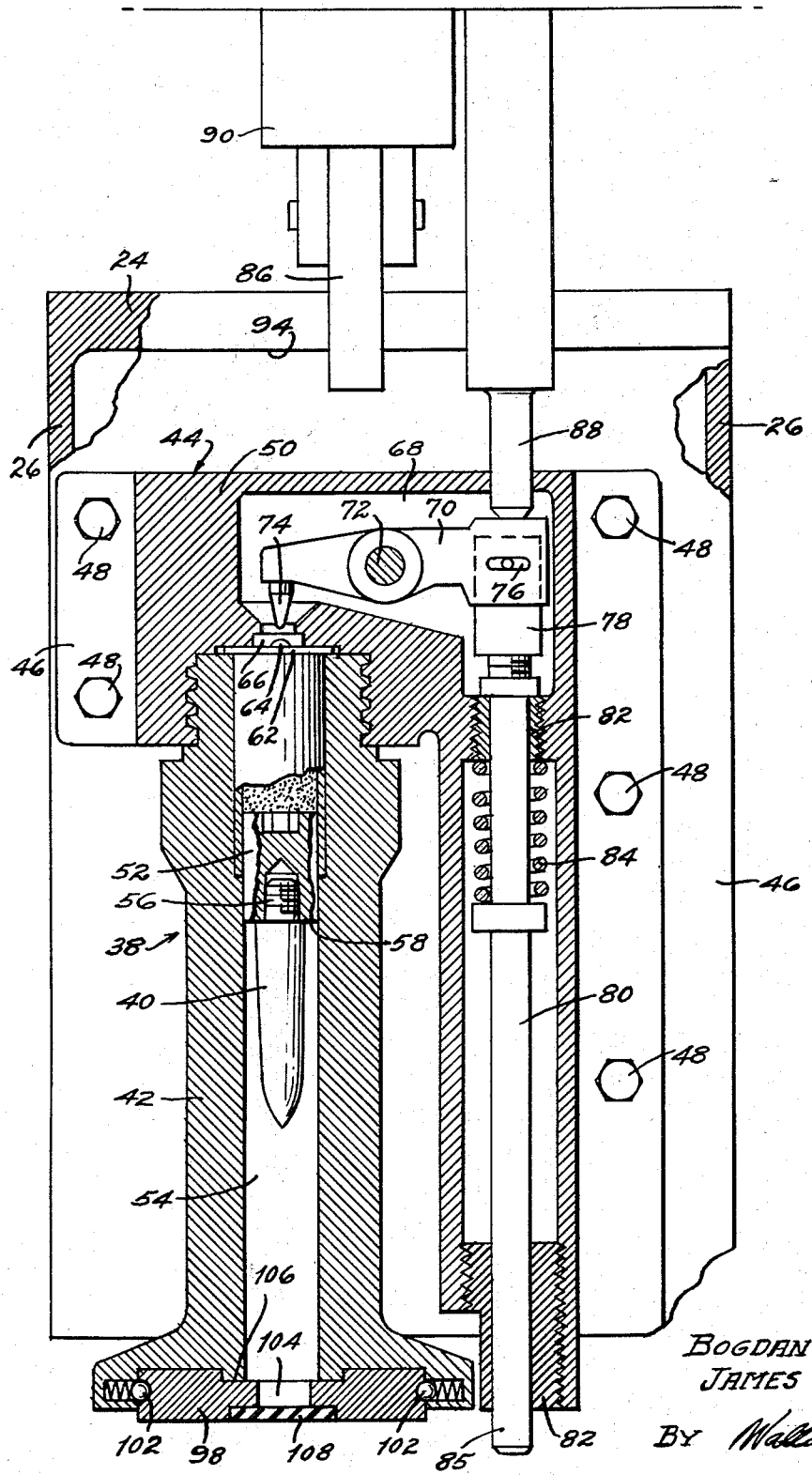

3,292,738
VEHICLE EMERGENCY BRAKE
Bogdan W. Bernert 8829 Britland Way, Fair Oaks, Calif. 95628, and James E. Haile, Fairfield, Calif. (1716 Doone Road, Columbus, Ohio 43221)
Filed Dec. 11, 1964, Ser. No. 417,596
6 Claims. (Cl. 188—6)

This invention relates generally to motor vehicles and particularly to emergency brakes therefor.

It is an object of the invention to provide an improved emergency brake particularly for heavy vehicles such as buses and trucks.

Another object of the invention is to provide an improved vehicle emergency brake for use in the event of failure of a vehicle's conventional brakes, and one which will effect smooth deceleration of heavy vehicles to a quick stop.

Another object of the invention resides in the operation of the brake by the firing of an anchor into a roadbed to effect a braking action which acts positively, quickly and smoothly to stop a vehicle on steep hills and on slippery roads.

Another object of the invention is to provide a vehicle emergency brake of the above mentioned character in which the energy of stopping the vehicle is absorbed by unrolling a metal strip from a coil through a sinuous resistance path of travel.

A further object of the invention resides in the firing of the anchor into a roadbed by trigger impact with the roadbed under control of the operator.

Other objects of the invention will become apparent from the following description of the invention, taken in connection with the accompanying drawings in which:

FIG. 1 is a fragmentary plan view of a vehicle chassis and our emergency brake mounted thereon;

FIG. 2 is a vertical sectional view, partly in elevation, taken along the line 2—2 of FIG. 1;

FIG. 3 is a vertical sectional view, taken along the line 3—3 of FIG. 2;

FIG. 4 is a vertical sectional view, partly in elevation, of a conventional brake pedal and emergency brake control switch;

FIG. 5 is a vertical sectional view of an anchor of the emergency brake illustrated as embedded in a roadbed; and FIG. 6 is a diagrammatical illustration of a control circuit for our emergency brake.

Referring to the drawings by characters of reference, the vehicle of FIG. 1 includes the conventional chassis frame having the usual side frame members 10 of which only one is shown, and cross members 12 and 14 of which only two are shown. The numeral 16 designates a differential housing supported on tubular rear axle housings 18 which may support the frame on any suitable well known road wheel suspension mechanism (not shown).

Our emergency brake mechanism includes a rectangular housing 20 having a bottom wall 22, top wall 24, side walls 26 and end walls 28 and 30. Rigidly secured to the housing end wall 28 there is a mounting 32 for pivotally mounting the brake housing 20 on one of the rear axle housings 18, the mounting shown being of the split type having a separate half journal member 34 rigidly secured to the mounting proper 32 by suitable studs 36.

Mounted on the housing end wall 30 there is a gun, designated generally by the numeral 38, which is positioned to fire and imbed an anchor member or steel pin 40 in a roadbed while the vehicle is enroute over said roadbed. The gun 38 includes a barrel 42 having a mounting 44 which may be a casting, as shown, having side flanges 46 to receive studs 48 for rigidly securing the mounting 44 to the housing end wall 30. An upper body portion 50 of the mounting 44 has a downwardly opening threaded bore into which an upper threaded end of the gun barrel 42 is screwthreaded to rigidly secure the gun barrel to the mounting.

As shown in FIG. 3, the missile or anchor member fired by the gun is preferably made in two parts including the aforementioned steel pin 40 and a single cylindrical member or shot 52, the latter of which fits snugly into the bore 54 of the gun barrel 42 and carries the pin. On its upper end, the pin 40 has a threaded stud 56 which is screwthreaded into the cylindrical member 52 to secure the parts together. The upper end of the tapered pin 40 has a diameter somewhat less than the diameter of the cylindrical member 52 so as to provide a downwardly facing shoulder 58, the purpose of which is hereinafter described. An upper portion of the gun barrel 42 is enlarged to receive a cartridge casing or shell 60 into which the upper end of the cylindrical member 52 is received, providing the usual powder chamber. The upper end of the shell 60 has the usual end flange 62 received in a recess in the casting 44, and a centrally located powder cap 64 is received in a bore 66 of the casting 44.

The bore 66 is in communication with an upper compartment 68 in the casting 44 within which there is a hammer 70 which is pivoted on a shaft 72, secured in the casting. One end of the hammer 70 overlies the powder cap 64 and carries a firing pin 74 positioned to strike the cap by pivoting the hammer counter-clockwise, as viewed in FIG. 3. The other end of the hammer 70 is bi-furcated as a clevis and is connected by a pin and slot connection 76 to the upper end of a connecting member 78 which connects the hammer to the upper end of a trigger in the form of a rod 80. The rod 80 is vertically guided in bushings 82 in the casting 44 and is urged upwardly by a helical coil spring 64. A lower end portion 85 of the trigger rod 70 projects below the casting 44 in position to strike a roadbed and operate the hammer 70.

Normally, the housing end wall 30, on which the gun 38 is mounted, is releasably supported by a retractable holder or latch member 86, and upward movement of the rod 80 by the spring 84 is limted by a safety stop member 88. As shown in FIG. 3, the stop member 88 is axially aligned with the rod 80 in position to abut with and near one end of the hammer 70 so as to limit the position of the firing pin 74 in spaced relation to the powder cap 64, thus normally preventing firing of the gun.

A power actuator or solenoid 90 is provided to release the latch member 86 against the opposition of a spring 92 which functions normally to hold the latch member engaged with a latch keeper 94 provided on the rear end of the brake housing. Instead of the solenoid 90, a manually operable lever accessible to a vehicle operator and connected by a cable (not shown) may be used to release the latch member 86, or an air cylinder, or any other suitable latch releasing means may be employed. One or more compression springs 96 are preferably provided to thrust the housing 20 clockwise, facing FIG. 2, to cause the trigger rod 80 to quickly strike a roadbed with a sharp impact. The springs 96 may be positioned between the vehicle frame cross member 12 and the top wall 24 of the housing 20, as shown in FIG. 2.

Releasably held to the lower end of the gun barrel 42 there is a disc-like connecting member 98 for connecting the gun fired anchor member 40, 42 to one end of a brake member in the form of an elongated metal strip 100 which may be spring steel. The disc-like connecting member 98 may have a slot 101 in its periphery to receive an end poriton of the steel strip 100 and the parts may be welded or be otherwise suitably secured together. The connecting member 98 is received and releasably held in a recess in the lower enlarged end of the gun barrel 42 by spring pressed detents 102. Further, the connecting member 98 is preferably provided with a centrally located clearance aperture 104 for the passing therethrough of the steel pin 40 of the anchor member, but is smaller in diameter than the cylinder member 52 which forms a head of the anchor to strike and carry the connecting member 98 therewith when the gun is fired. A centrally located extension 106 of the gun barrel 42, concentric with the bore and aperture 104 fits into a recess in the upper face of the disc 98 for alignment of the aperture 104 with the pin 40. In a recess in the lower face of the disc 98, a closure member 108, preferably a disc of plastic or other suitable material, is press fitted to protect the gun bore from the entrance of dust, water and other foreign matter.

Within the housing 20 there is a reel 110 on which the metal strip 100 is wound, the reel being mounted on a shaft 112 which is journaled in the opposite side walls of the housing. From the reel 110, the metal strip 100 extends over and bears against a spool 114 which is rotatably mounted on a shaft 116, journaled for rotation in the opposite housing side walls 26. Between the spool 114 and the connecting member 98, the metal strip 100 passes between a pair of spaced apart guide rollers 118 and 120 located in an opening 122 provided in the bottom and end walls 22 and 30 respectively of the housing 20. Between the spool 114 and the guide rollers 118, 120 some slack in the metal strip 100, as indicated by the sinuous loops 124, is provided to allow unrestricted flight of the steel pin 40 into a roadbed.

Affixed onto the reel shaft 112 there is a gear 126 which is in mesh with and drives a similar gear 128 which in turn is affixed onto a shaft 130, below and parallel to the shaft 112. Another shaft 132 extends longitudinally of and within the housing 20, the shaft being journaled on spaced apart suitable standards 134, 136 and 138 at right angles to shaft 130. A bevel gear 140 affixed onto the shaft 130 meshes with a similar bevel gear 142, affixed onto shaft 132 to provide a driving connection therebetween. A worm gear 144, secured onto the shaft 132, meshes with and drives a gear or worm wheel 146 which is secured onto the rotatable shaft 116.

The gear train, and particularly the worm gear 144 and worm wheel 146 provide some braking action opposing the unwinding of the metal brake strip 100 from its reel 110, but in order to effect an efficient and smooth braking action, we provide a brake member or strip bender 148 so as to utilize the energy of bending the strip to stop the vehicle. To this end, the strip bender 148 comprises preferably a pair of levers 150, of which only one is shown, which are affixed onto the spool shaft 116 and straddle the metal strip 100. At their free ends, a fixed shaft 152 connects the levers 150 together and mounted on the shaft 152 there is a roller 156 which bears against the upper surface of the metal strip 100, intermediate the spool 114 and the reel 110.

In FIG. 4, the numeral 156 designates the floor of a vehicle having the usual toe riser 158 through which projects a conventional brake pedal arm 160. Mounted on the underside of the toe riser 158 there is a switch device 162 having a projecting operating plunger 164 positioned to be engaged and depressed by the brake pedal pad. The distance "A" represents the normal distance of travel of the brake pedal, but in the event of a failure in the conventional fluid brake system, the pedal would or could be moved downwardly to depress the switch plunger 164 and close the normally open switch. As shown in FIG. 6, the switch 162 is connected in series with the latch releasing coil of the solenoid 90, the switch and solenoid being connected to a suitable source of electrical energy, such as the battery 166 of the vehicle electrical system. Also connected in series circuit with the switch 162 there is preferably a second and manually operable switch 168 which may be mounted on the vehicle instrument panel. By this arrangement it will be necessary for the vehicle operator to close both of the switches 162 and 168 in order to energize the latch retraction solenoid 90, the purpose being to avoid accidental release of said latch member 86.

*Operation*

In the operation of the vehicle, if the conventional fluid brake system should fail, the brake foot pedal 160 would depress ineffectively beyond its normal range of operation and close the switch 162. Such an abnormal movement of the foot pedal 160 would signal the operator of the emergency, who would then close the switch 168, thus completing a circuit to the solenoid 90. Upon its energization, the solenoid 98 retracts the latch member 86 against the opposition of the spring 92 which releases the rear end of the emergency brake housing. The housing 20 swings clockwise about its fulcrum 18 away from the fixed safety pin 88, FIG. 2, and the lower end of the trigger rod 86 strikes the roadbed. This drives the trigger rod 80 upwardly to operate the hammer 70 which drives the hammer pin 74 down against the cap 64 and fires the charge whereupon the shot 52 and connected steel pin 40, are fired downwardly toward the roadbed. The steel pin 40 clears the restricted gun barrel aperture 104, but the shoulder 58 of the shot 52 strikes and carries the disc 102 with it, the steel pin 40 being embedded in the roadbed, as shown in FIG. 5, and securely anchoring the free end of the brake strip 100 to the roadbed. The slack 124 in the loops of the metal strip 100 is quickly taken up and the continued travel of the vehicle against the roadbed anchor now causes the metal strip 100 to be unwound from the reel 110. This rotates the reel 110, the rotatable shaft 112 and gear 126 clockwise, as viewed in FIG. 2 which drives the worm gear 144 which in turn rotates the worm wheel 146 in a counter-clockwise direction. This rotates shaft 116 and therefore the brake operator 150 in a counter-clockwise direction, and the roller 154 is thrust downwardly and bends the metal strip 100, as indicated by the dot and dash lines. Thus, the inertia of the vehicle is utilized to bend the metal strip 100 to oppose and decelerate and stop the vehicle. At the time of firing of the shot 52 and anchor pin 40, a signal such as a flare may be initiated to warn traffic in the area. To avoid the blocking of traffic any longer than is necessary, the pin 40 may be left in the roadbed and the metal strip 100 may be readily detached from the pin by unscrewing the shot 52 therefrom after which the hole in the road may be filled by a suitable cement or plastic material.

While we have shown and described our vehicle emergency brake in considerable detail, it will be understood that various modifications and variations may be made without departing from the spirit and scope of our invention.

What we claim is:

1. A motor vehicle brake apparatus comprising a supporting member to be mounted on a vehicle for downward movement to a roadbed, releasable means normally holding said supporting member in a raised position, a brake member, an anchor member carried by said supporting member to be projected into roadbed and operatively connected to said brake member, means activatable to propel said anchor member into a roadbed, a trigger member carried by said supporting member and operatively connected to and for activating said activatable means, said trigger member being operated by its impact with a roadbed following release of said supporting member by said releasable means and manually operated control means operatively connected to and for releasing said releasable means.

2. A motor vehicle brake apparatus comprising a mounting on the vehicle, a supporting member pivotal on said mounting about an axis transverse to the direction of vehicle travel and having a free end rearwardly of the pivot to swing down to a roadbed, releasable means normally holding said supporting member in a raised position, a brake member, an anchor member to engage in a roadbed and operatively connected to said brake member, normally inactive means operatively connected to and for propelling said anchor member into a roadbed, means operable to activate said anchor member and drive said anchor member into a roadbed, a trigger member carried by said supporting member and operatively connected to said activating means to activate the latter, said trigger member operable against the roadbed following release of said pivotal supporting member, and a manually operable control member operatively connected to and for releasing said releasable means.

3. A motor vehicle brake apparatus comprising a supporting member to be pivotally mounted on a vehicle on an axis transversely of the vehicle and to extend rearwardly from the axis, a retractable holder normally holding said supporting member against pivoting down to a roadbed, a gun carried by said supporting member and directed downwardly, an anchor member within said gun and propellable therefrom into a roadbed, a brake member operatively connected to said anchor member, a hammer operable to fire said gun and carried by said supporting member adjacent the rear end thereof, a trigger carried by said supporting member and actuated by impact with a roadbed following release of supporting member by said holder, and a control member manually activated to retract said holder.

4. A motor vehicle brake apparatus comprising a supporting member to be pivotally mounted on a vehicle on an axis transversely of the vehicle and to extend rearwardly from the axis, a retractable holder normally holding said supporting member against pivoting down to a roadbed, a gun carried by said supporting member and directed downwardly, an anchor member within said gun and propellable therefrom into a roadbed, a brake member operatively connected to said anchor member, a hammer operable to fire said gun and carried by said supporting member adjacent the rear end thereof, a trigger carried by said supporting member and actuated by impact with a roadbed following release of supporting member by said holder, a control member manually activated to retract said holder, and a movable safety member normally rendering said hammer inactive and releasable by and upon retraction of said holder.

5. A motor vehicle brake apparatus comprising a supporting member to be pivotally mounted on a vehicle on an axis transversely of the vehicle and to extend rearwardly from the axis, a retractable holder normally holding said supporting member against pivoting down to a roadbed, a gun carried by said supporting member and directed downwardly, an anchor member within said gun and propellable therefrom into a roadbed, a brake member operatively connected to said anchor member, a hammer operable to fire said gun and carried by said supporting member adjacent the rear end thereof, a trigger carried by said supporting member and actuated by impact with a roadbed following release of supporting member by said holder, a control member manually activated to retract said holder, and a movable stop member interposed between and spacing said holder and said trigger apart and releasable by said holder.

6. A motor vehicle brake apparatus comprising a supporting member pivotally mountable on the vehicle and having one end swingable downwardly toward a roadbed, a releasable holder normally holding said supporting member in a raised position, manually controlled means operable to release said holder, an anchor member carried by said supporting member, means operable to propel said anchor member into a roadbed, a trigger member controlling said propelling means and operated by impact with the roadbed following release of said supporting member by said holder, a reel mounted on said supporting member, a metal connecting strip wound on said reel and having one end attached to said anchor member, and yieldable means opposing rotation of said reel in a direction unwinding said metal connecting strip.

References Cited by the Examiner

FOREIGN PATENTS 564,630   6/1957   Italy.

DUANE A. REGER, *Primary Examiner.*